(12) United States Patent
Besnard et al.

(10) Patent No.: US 10,341,631 B2
(45) Date of Patent: Jul. 2, 2019

(54) CONTROLLING MODES OF SUB-TITLE PRESENTATION

(71) Applicant: Harmonic, Inc., San Jose, CA (US)

(72) Inventors: Xavier Besnard, Acigne (FR); Michel Jouan, Saint Aubin du Cormier (FR)

(73) Assignee: Harmonic, Inc., San Jose, CA (US)

( * ) Notice: Subject to any disclaimer, the term of this patent is extended or adjusted under 35 U.S.C. 154(b) by 19 days.

(21) Appl. No.: 15/510,149

(22) PCT Filed: Sep. 11, 2015

(86) PCT No.: PCT/EP2015/070829
§ 371 (c)(1),
(2) Date: Mar. 9, 2017

(87) PCT Pub. No.: WO2016/041859
PCT Pub. Date: Mar. 24, 2016

(65) Prior Publication Data
US 2017/0302900 A1    Oct. 19, 2017

(30) Foreign Application Priority Data
Sep. 17, 2014 (FR) ...................................... 14 58793

(51) Int. Cl.
*H04N 21/44* (2011.01)
*H04N 9/82* (2006.01)
(Continued)

(52) U.S. Cl.
CPC ......... *H04N 9/8233* (2013.01); *G11B 27/031* (2013.01); *G11B 27/10* (2013.01);
(Continued)

(58) Field of Classification Search
None
See application file for complete search history.

(56) References Cited

U.S. PATENT DOCUMENTS 5,572,260 A * 11/1996 Onishi ................... G09B 5/065
                                                    348/460
8,782,721 B1 * 7/2014 Kellicker ....... H04N 21/234336
                                                    348/468
(Continued)

OTHER PUBLICATIONS

CaptionMaker.McaCaption 6.0, Oct. 1, 2013.*
(Continued)

*Primary Examiner* — Cai Y Chen
(74) *Attorney, Agent, or Firm* — Brokaw Patent Law PC; Christopher J. Brokaw

(57) ABSTRACT

Creating a sub-titles stream or file composed of sub-titles elements. For each sub-titles element in said sub-titles elements, a sub-titles element is inserted into the sub-titles stream or file, at least one end-of-block condition related to a mode of presentation of sub-titles is verified, and a datum representative of an end of a block according to the mode of presentation of sub-titles is inserted into the sub-titles stream or file upon satisfying said at least one end-of-block condition. A sub-titles stream or file may be presented on a terminal of a user by selecting on the terminal a mode of presentation of sub-titles, reading a sub-titles block associated with the mode of presentation in the stream or file, and presenting on the terminal the at least one sub-titles block according to the mode of presentation.

22 Claims, 11 Drawing Sheets

(51) Int. Cl.
    *G11B 27/031*     (2006.01)
    *G11B 27/10*     (2006.01)
    *H04N 21/431*     (2011.01)
    *H04N 21/435*     (2011.01)
    *H04N 21/488*     (2011.01)
    *H04N 21/8543*     (2011.01)

(52) U.S. Cl.
    CPC ....... *H04N 21/435* (2013.01); *H04N 21/4314* (2013.01); *H04N 21/4884* (2013.01); *H04N 21/8543* (2013.01)

(56) References Cited

U.S. PATENT DOCUMENTS

| | | |
|---|---|---|
| 2008/0085099 A1 | 4/2008 | Guihot |
| 2011/0013888 A1* | 1/2011 | Sasaki .................. G11B 27/034 386/353 |
| 2015/0215564 A1 | 7/2015 | Robinson |

OTHER PUBLICATIONS

European Patent Office, International Searching Authority, International Search Report and the Written Opinion of the International Searching Authority for International Application No. PCT/EP2015/070829, International Filing Date: Sep. 11, 2015, 14 pages.

Anonymous, CaptionMaker/MacCaption 6.0 Quick Start Guide, MacCaption and CaptionMaker Quick Start Guide, Video Captioning for any Mac/PC Digital Workflow, Oct. 1, 2013, 66 Pages, XP055194550, Telestream, Inc.

* cited by examiner

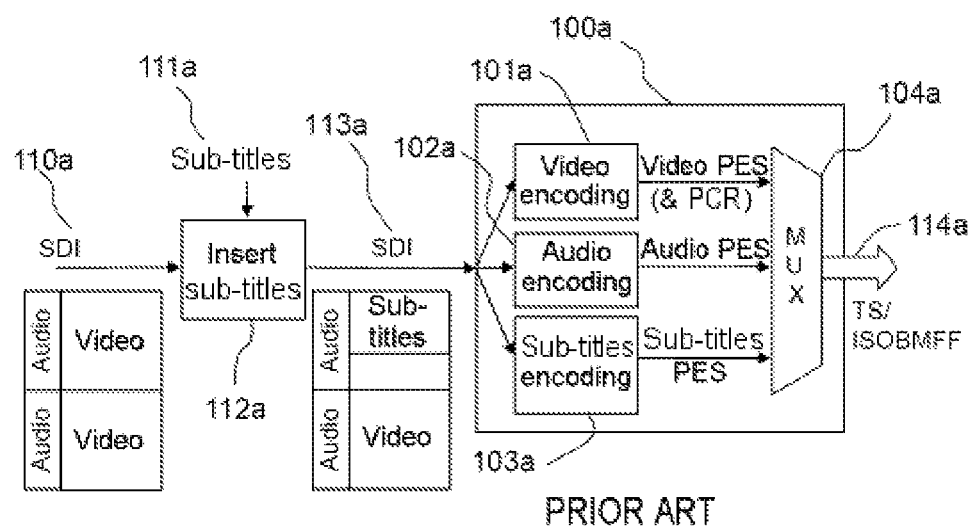
PRIOR ART
FIG.1a
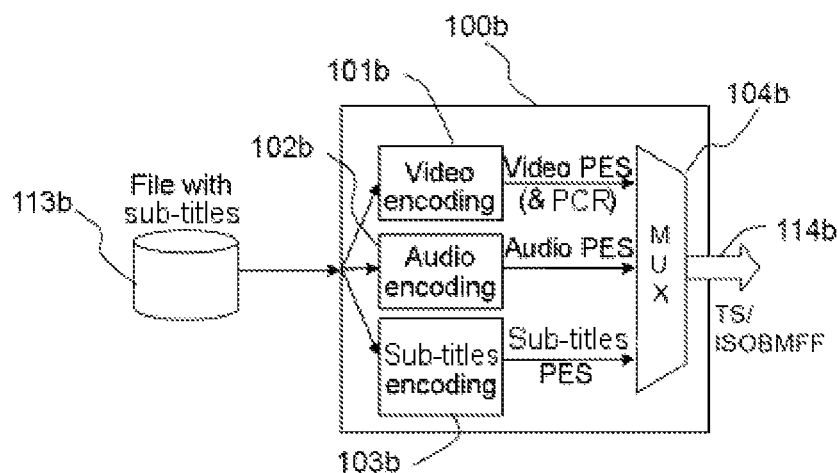
PRIOR ART
FIG.1b

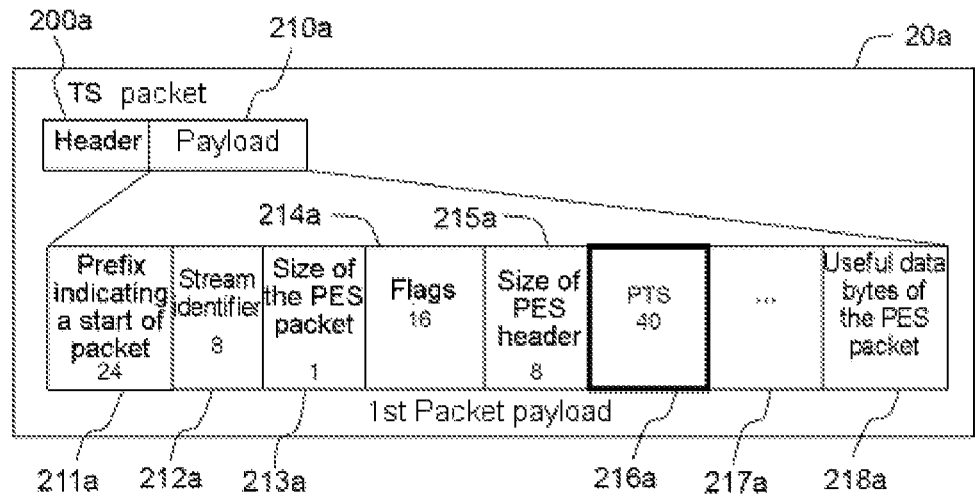
PRIOR ART
FIG.2a
PRIOR ART
FIG.2b

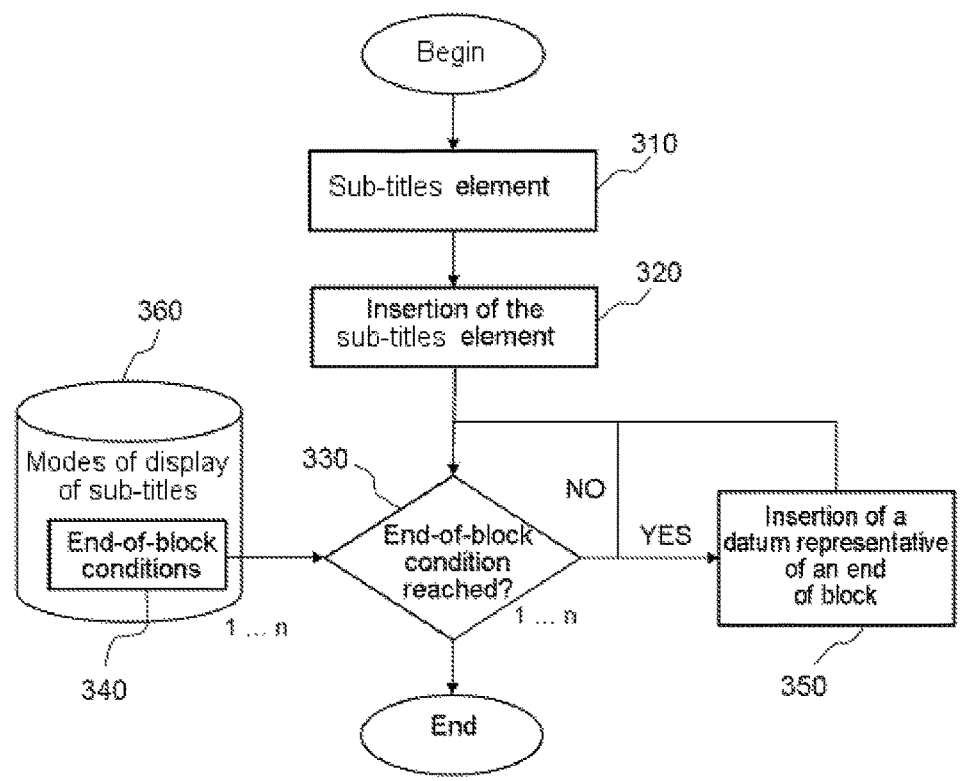
FIG.3

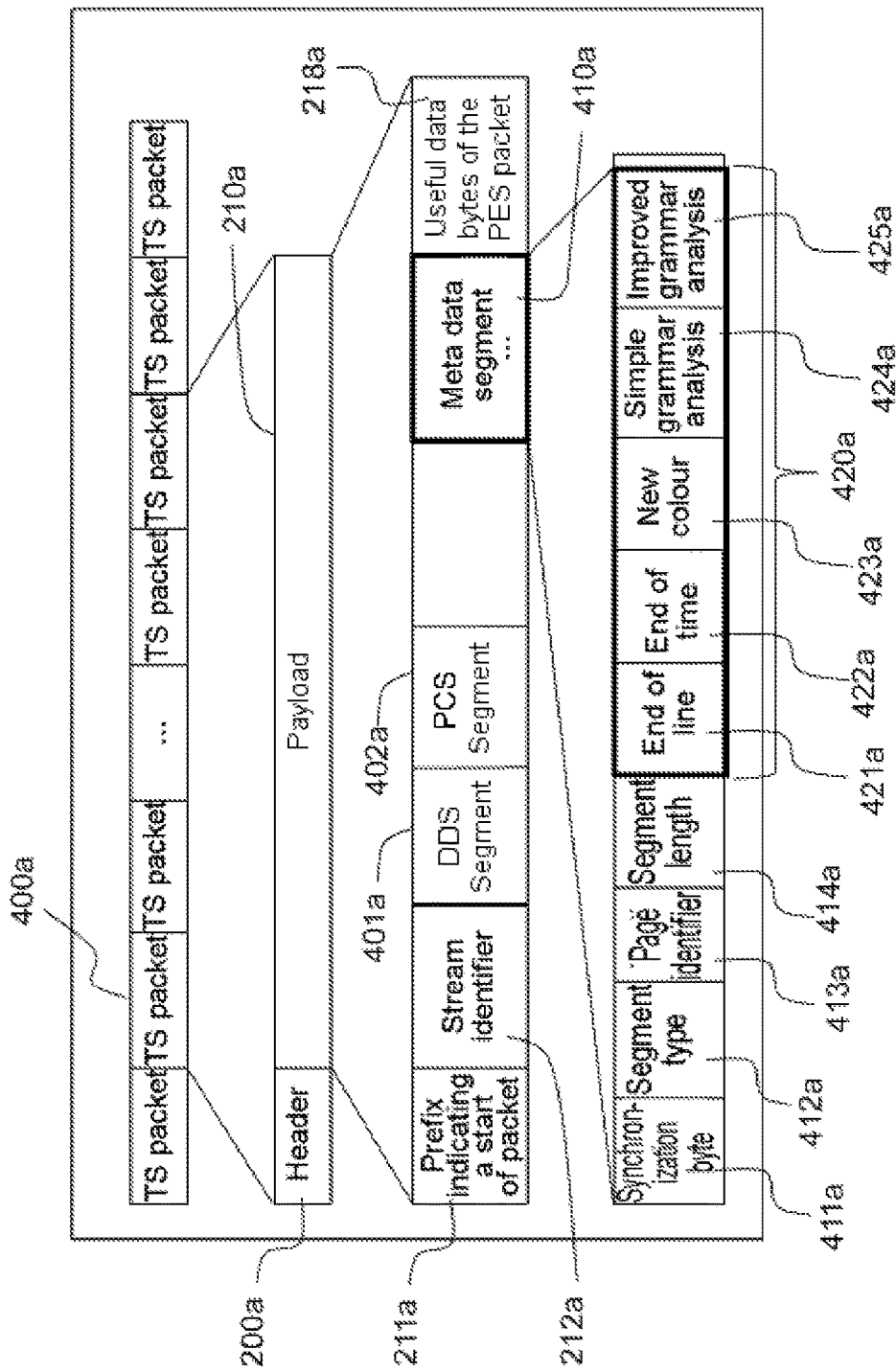
FIG.4a

```
<?xml version="1.0" encoding="UTF-8"?>                              — 410b
<tt:tt xml:lang="en" ... >
    <tt:head>                                                        — 420b
        <tt:metadata>
        <tt:styling>
        <tt:layout>
    </tt:head>
    <tt:body>                                                        — 430b
        <tt:div>                                                     — 440b
            <tt:p xml:id="sub2" end="00:00:04:21" begin="00:00:02:14" ... >
                                 443b   442b                  441b
            <tt:br/>                                                 — 450b
            <tt:span style="WhiteOnBlack">                           — 451b
                Hello this is an example of a live sub-title         — 452b
            </tt:span>
            <tt:display_mode end_of_line="true" end_of_time="false" new_colour="false"
                                        461b            462b               463b
                simple_grammar_analysis="true" improved_grammar_analysis="true"> <tt:display_mode>
                           464b                             465b
            </tt:p>
        </tt:div>
    </tt:body>
</tt:tt>
```

FIG.4b

```
<?xml version="1.0" encoding="UTF-8"?>
<tt xml:lang="en" ... >
  <head>
    <ttm:title>
    <ttm:desc>
    <ttm:copyright>
    <some_information>
    <styling>
    <layout>
  </head>
  <body>
    <div>
      <p tts:origin="47% 10%" end="00:00:04.21" begin="00:00:02.14" >
        <span>
          Hello this is an example of a live sub-title
        </span>
        <display_mode end_of_line="true" end_of_time="false" new_colour="false"
        simple_grammar_analysis="true" improved_grammar_analysis="true"</display_mode>
      </p>
    </div>
  </body>
</tt>
```

FIG.4c

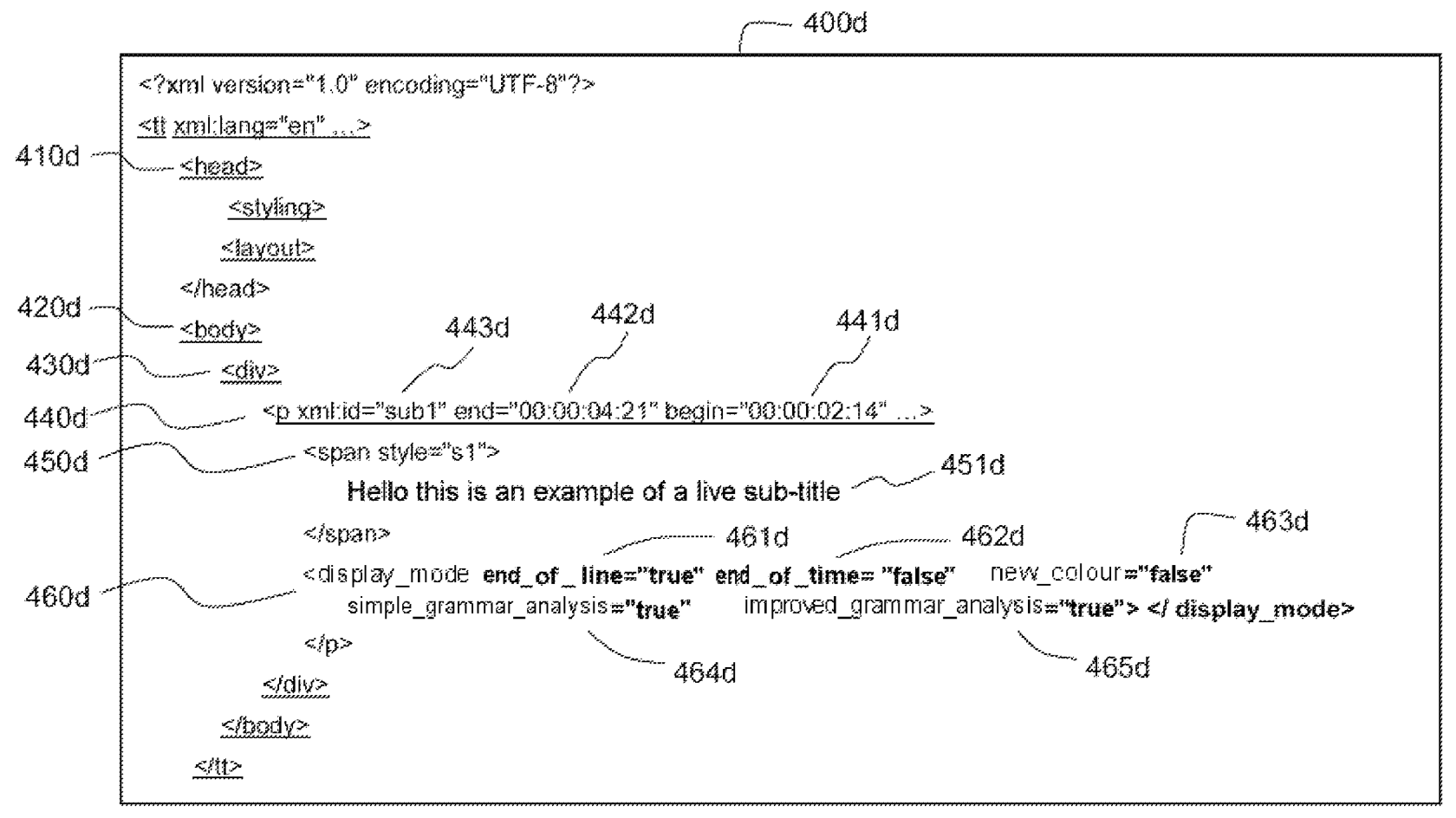

```
<?xml version="1.0" encoding="UTF-8"?>
<tt xml:lang="en" ... >
  <head>
    <styling>
    <layout>
  </head>
  <body>
    <div>
      <p xml:id="sub1" end="03:00:04:21" begin="03:00:02:14" ... >
        <span style="s1">
          Hello this is an example of a live sub-title
        </span>
        <display_mode end_of_line="true" end_of_time="false" new_colour="false"
          simple_grammar_analysis="true" improved_grammar_analysis="true" </display_mode>
      </p>
    </div>
  </body>
</tt>
```

FIG.4d

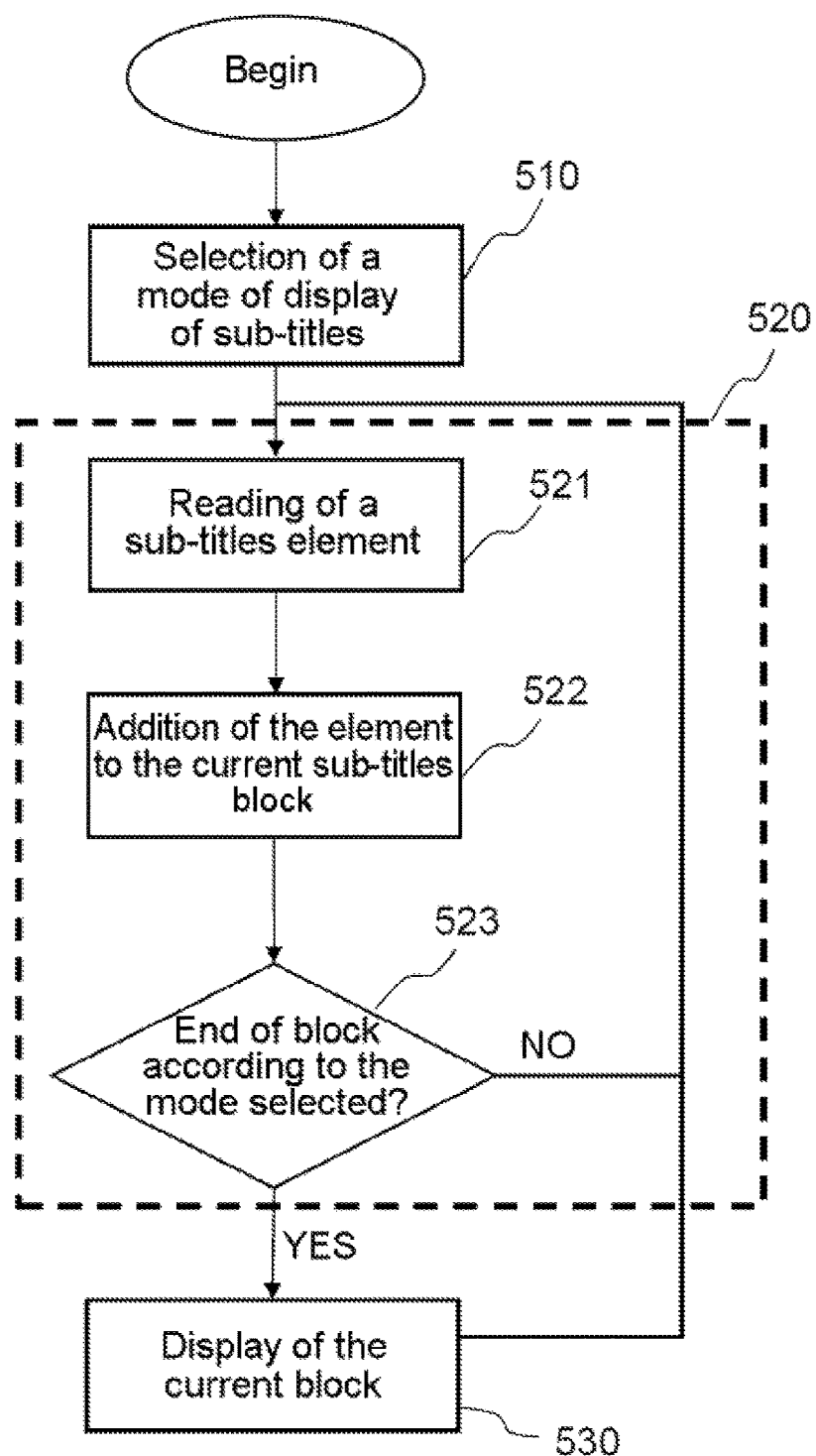
FIG.5

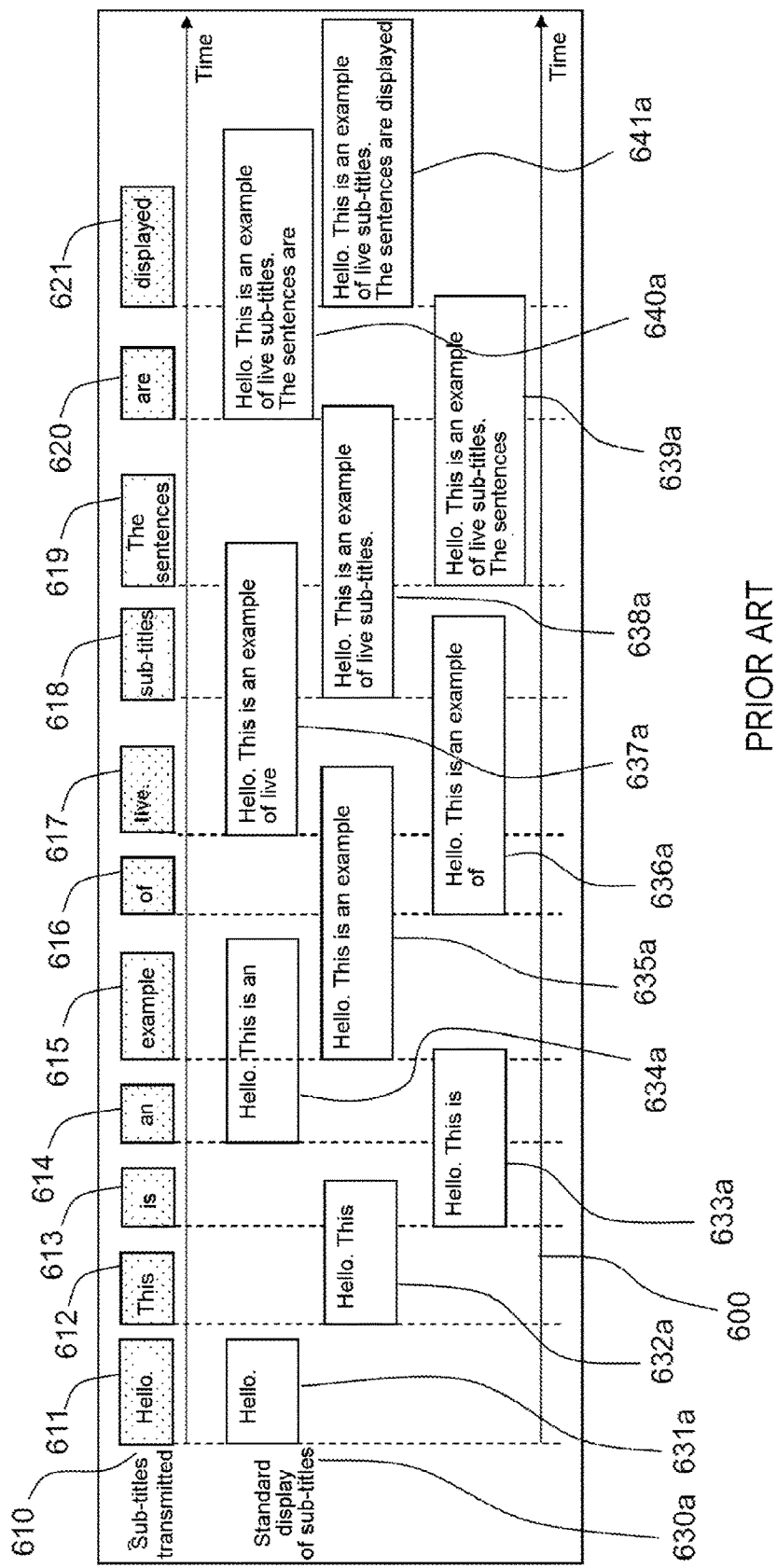
FIG.6a PRIOR ART

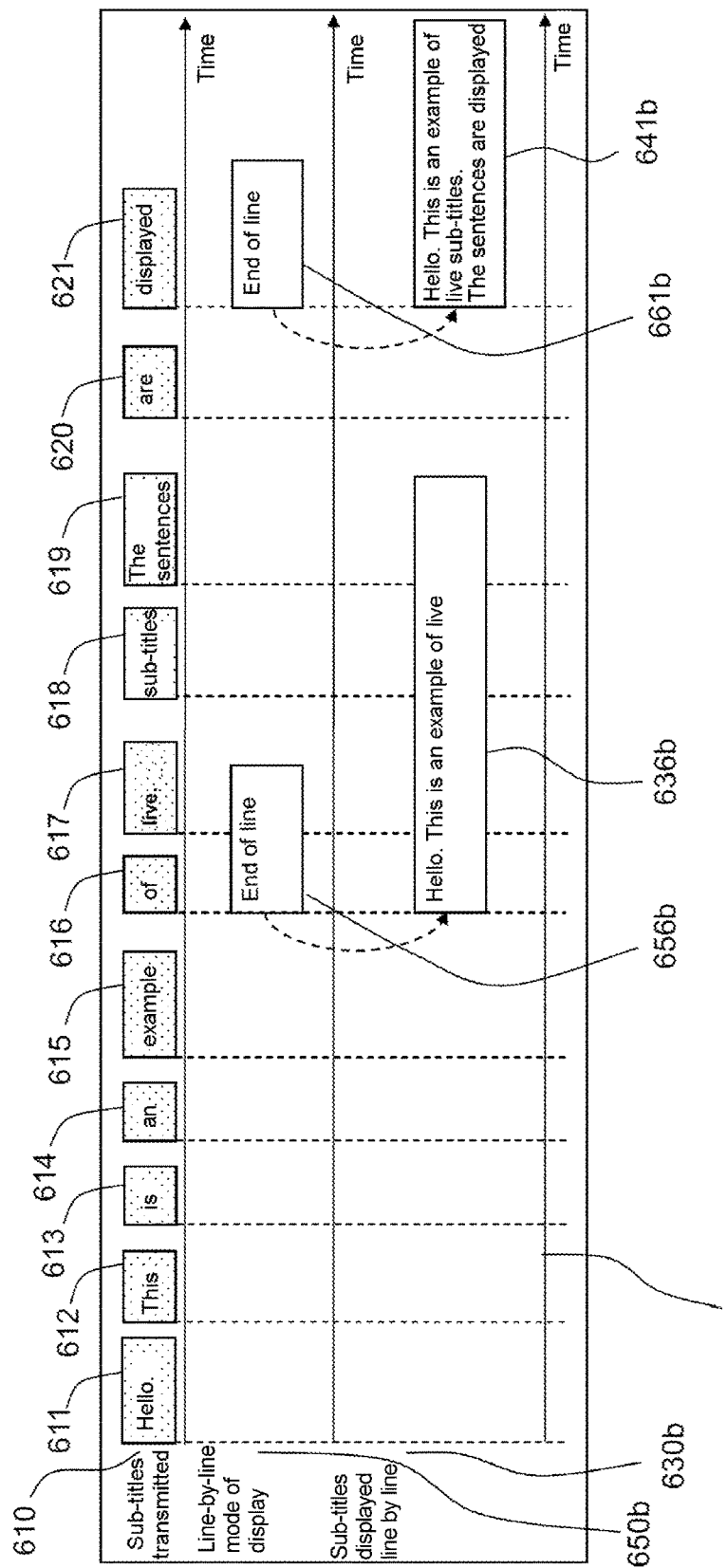
FIG.6b

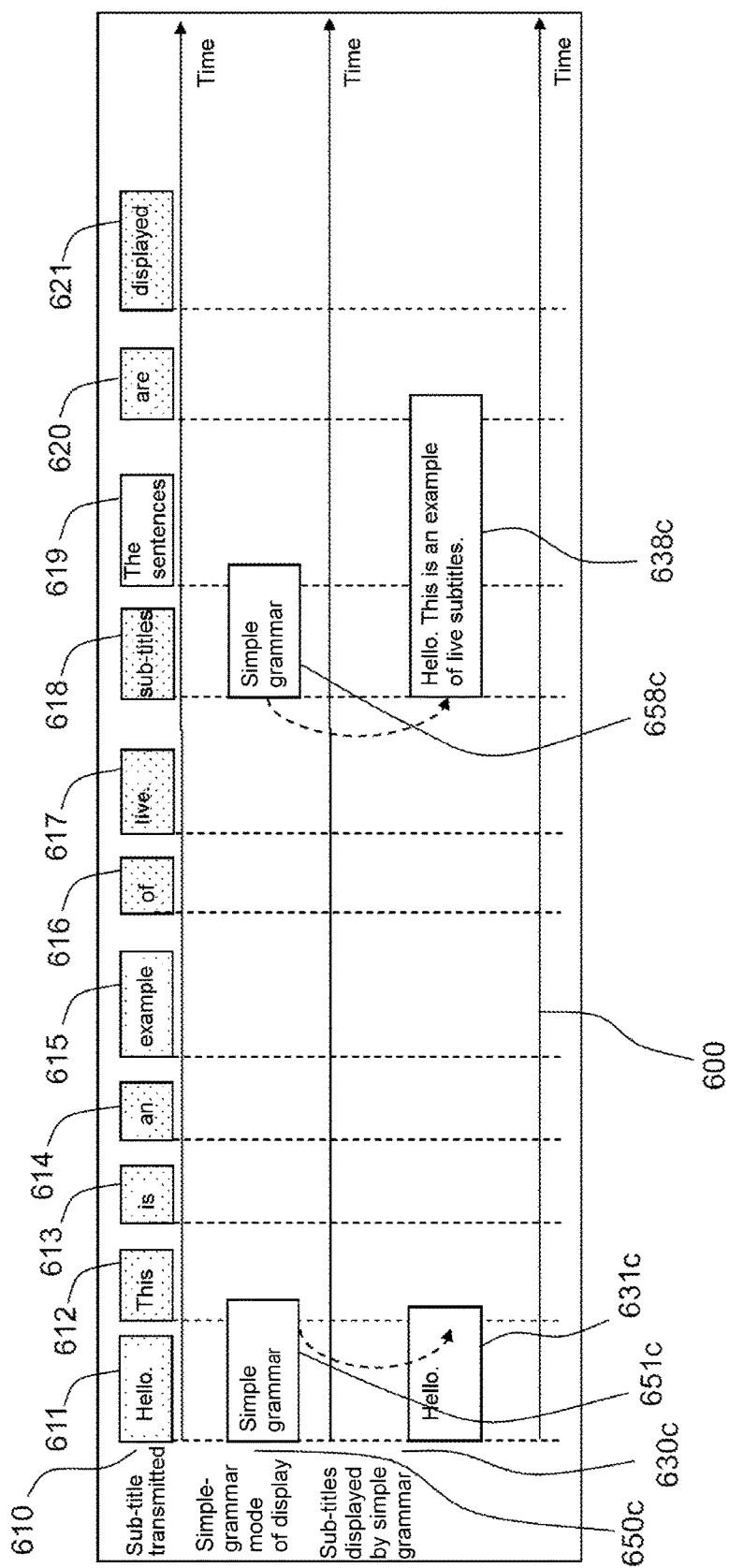
FIG.6c

CONTROLLING MODES OF SUB-TITLE PRESENTATION

CLAIM OF PRIORITY

The present application is a U.S. National Stage Application under 35 USC § 371 of PCT Patent Application No. PCT/EP2015/070829, entitled "Method of Controlling Modes of Presentation of Sub-Titles," filed Sep. 11, 2015, having a priority date of Sep. 17, 2014, the disclosure of which is hereby incorporated by reference for all purposes in its entirety as if fully set forth herein.

FIELD OF THE INVENTION

Embodiments of the invention generally relate to the field of video sub-titling, and more particularly, relate to real-time digital video sub-titling.

BACKGROUND

The application of sub-titles is an important element in video stream production. Sub-titles enable a user to have a better understanding of the content of the video, and particularly of the speech uttered, when the latter is hardly, if at all, understandable. This is particularly useful when a program is transmitted in a language not known to the user or when the auditory perception of the language is disturbed by poor transmission, poorly articulated speech, or background noise. Sub-titles also enable the hard of hearing to achieve an understanding of the program.

The application of sub-titles may be performed either offline or in real time (so-called live sub-titles in the parlance of the art). The application of sub-titles offline is performed on a support prepared in advance. This type of sub-titling is found, for example, in DVDs, Blu-ray discs, or transmissions broadcast offline. This offline application does not present any particular time constraint. Thus, it is possible in this case to manually insert sub-titles into the video stream, an operator verifying that the sub-titles are perfectly synchronized with the video, while presenting a visual aspect perceived to be pleasant by the user. Although subjective, this notion of pleasant perception of the sub-titles can be reduced to objective elements, for example, obtaining sub-titles which are displayed at a moderate speed, or which retain a fixed position with respect to the screen. It is also possible to use audio analysis schemes which may turn out to be expensive in calculation time to best synchronize the sub-titles and the audio/video.

On the other hand, it is not possible to use these techniques in the case of live sub-titles, as in this case the video content produced is transmitted immediately. The production of live sub-titles is generally performed by an operator producing the sub-titles live and dispatching them in the stream. This operation produces an inevitable lag between the moment at which the video is transmitted and the moment at which the corresponding sub-title is produced. This lag is still more significant when the task of the operator induces a translation from one language to the other for the production of the sub-titles.

The approach generally used to process live sub-titles is to transmit each word of sub-titles as soon as it is available in order not to add any further lag. However, this approach has drawbacks, e.g., in addition to an inevitable lag, the words arrive one after another, not always forming a coherent whole. Moreover, when the sub-titles are formed on the basis of a teletext source, a line feed may entail an upwards shift of the words. This upwards shift, or "shift up" as it is called, consists, when a new line of sub-titles begins, in shifting the set of lines of sub-titles by one line upwards and in deleting the oldest line. This effect may be particularly disturbing for the viewer, since if a word that he was reading is shifted upwards, he will have to make an additional effort to follow this word while retaining the overall sense of the sub-title.

Live sub-titles are thus often perceived by users as unpleasant and of poor quality. The presentation of the words of sub-titles has been listed as one of the main causes of poor perception of live sub-titles by users by Ofcom (Office of Communications), *The quality of live subtitling*, pp. 29-30. According to this study, users seem to prefer sub-titles presented in blocks. However, the definition of a "block" remains broad, and certain users may prefer sub-titles presented line by line, whereas other users may prefer sub-titles presented sentence by sentence, while other users might prefer sub-titles presented on a word by word basis.

The known schemes of the prior art involve producing or updating a page of sub-titles in a video encoder. The sub-titles can be encoded in the form of images, such as for example in the DVB-SUB standard (the acronym standing for Digital Video Broadcasting Subtitles). In this case, the style of sub-titles (colour, size of the characters, etc.) is defined by the image.

Sub-titles may also be encoded in the form of textual characters, such as for example in the various standards based on W3C TTML (the acronym standing for World Wide Web Consortium Timed Text Markup Language). In this case, the sub-titles are stored in the form of characters forming words as in a text file, and optionally header information that specifies a presentation style to be applied. The presentation style may contain information such as the size of characters to be applied, the font, and the like. By way of example, the presentation styles available in the EBU-TT standard (the acronym standing for European Broadcasting Union-Timed Text), arising from W3C TTML, are described in the document EBU-UER, *EBU-TT Part 1, Subtitling format definition*.

U.S. Pat. No. 8,695,048 describes an approach for transcribing sub-titles for the deaf and hard of hearing from a first format to a second format independent of the platform. The second format can be based on the DVB-SUB standards or standards based on W3C TTML, such as for example EBU-TT or SMPTE-TT (the acronym standing for Society of Motion Picture and Television Engineers-Timed Text).

U.S. Pat. No. 5,497,241 (the '241 patent) describes a system making it possible to display sub-titles by blocks in a video. The blocks in the '241 patent are predefined blocks where each block is associated with a particular language. Thus, the choice of the language determines the form of the blocks and of the presentation.

The standards and techniques for coding sub-titles available today therefore make it possible to represent sub-titles with varied styles (different character fonts essentially), separate these sub-titles into blocks, and display the sub-titles blocks according to a desired style.

BRIEF DESCRIPTION OF THE DRAWINGS

Embodiments of the invention are illustrated by way of example, and not by way of limitation, in the figures of the accompanying drawings and in which like reference numerals refer to similar elements and in which:

FIG. 1a is an illustration of an exemplary video encoder producing a stream with sub-titles on the basis of live contents according to the prior art;

FIG. 1b is an illustration of an exemplary video encoder producing a stream with sub-titles on the basis of a file according to the prior art;

FIG. 2a is a diagram of a multimedia stream structure integrating sub-titles in accordance with MPEG-TS, one of the standards based on W3C TTML, according to the prior art;

FIG. 2b is a diagram of a multimedia stream structure integrating sub-titles in accordance with EBU-TT, one of the standards based on W3C TTML, according to the prior art;

FIG. 3 is a flowchart of the steps involved in creating a sub-titles stream or file composed of sub-titles elements according to an embodiment of the invention;

FIGS. 4a, 4b, 4c and 4d represent four examples of sub-titles produced by an embodiment of the invention, respectively in an MPEG-TS stream structure and in files according to the EBU-TT, SMPTE-TT and W3C TTML standards;

FIG. 5 is a flowchart illustrating an approach for presenting a sub-titles stream or file on a user's terminal; and FIGS. 6a, 6b and 6c are diagrams respectively illustrating three examples of modes of presentation of sub-titles according to the prior art in FIG. 6a and according to the invention in FIGS. 6b and 6c.

DETAILED DESCRIPTION OF THE INVENTION

Approaches for creating a sub-titles stream or file composed of sub-titles elements are presented herein. In the following description, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Overview

The known techniques of the prior art do not allow the user to choose, on the basis of one and the same source of sub-titles, a mode of presentation and of segmentation in block-wise form. This problem particularly affects live sub-titles where the only mode of presentation is often the word-by-word mode. However, it also applies to sub-titles prepared in advance, for which a mode of presentation prepared in advance (for example, line by line display) may be different from the preferred mode of presentation of the user (for example, sentence by sentence).

In an advance of the art, embodiments of the invention enable controlling the form of presentation of sub-titles, thereby making it possible to offer the user several modes of presentation for one and the same content of sub-titles, while allowing the user great flexibility in the choice of his preferred mode of presentation. Embodiments of the invention may be employed with any mode of transport. For example, embodiments may be employed with multimedia streams (such as a MPEG-TS (Motion Picture Experts Group—Transport Stream) stream) as well as a file (such as a file in the ISOBMFF (International Standards Organisation Base Media File Format) format).

Embodiments may be employed with any type of representation of sub-titles. For example, embodiments may be used with sub-titles represented in image form (such as sub-titles expressed within the framework of the DVB-SUB standard) as well as sub-titles represented in text form (such as sub-titles expressed within the framework of the various standards based on W3C TTML (EBU-TT, SMPTE-TT, and the like)).

Embodiments are directed towards the creation of a sub-titles stream or file composed of sub-titles elements. In an embodiment, for each sub-titles element, the sub-titles element is inserting into the sub-titles stream or file and at least one end-of-block condition is verified. The block comprises at least one sub-titles element and the end-of-block condition is related to a mode of presentation of the sub-titles. When the at least one end-of-block condition is satisfied, a datum representative of the end of a block according to the mode of presentation of sub-titles is inserted into the sub-titles stream or file. The datum representative of the end of a block may be written in a specific tag.

The end-of-block condition may include the detection of at least one predefined character marking the end of a block, such as a full stop, a comma, a semicolon, or a punctuation character. Embodiments may create a sub-titles stream that complies with the MPEG-TS standard or a sub-titles file that complies with at least one standard based on W3C TTML. Other embodiments and description shall be presented below in additional detail.

Context And Acronyms

In the subsequent description, embodiments of the invention are illustrated by examples relating to the generation of sub-titles in an encoder and the presentation of sub-titles by a decoder. It is noted that embodiments can be applied to any type of sub-title processing device, such as a transcoder included in a video processing chain.

Certain acronyms customarily used in the technical field of the present patent application may be employed in the course of the description and figures. These acronyms are listed in the table herein below along with their expression and a description.

| Acronym | Expression | Description |
|---|---|---|
| AAC | Advanced Audio Coding | Audio compression and coding standard. |
| ABR | Adaptive Bit Rate | Describes a multimedia stream whose bitrate can be adapted, notably to provide only the data sufficient to achieve a given quality, or to adapt to a transmission capacity. |
| AVC | Advanced Video Coding | Video compression and coding standard, also called H.264. |
| DDS | Display Definition Segment | Segment of the DVBSUB norm indicating the resolution (Height × Width) on which the sub-titles must be displayed. |
| DVB | Digital Video Broadcasting | Consortium that has produced several standards for digital television. Applies also to the standards produced, notably the DVBSUB sub-titles standard, or ETSI EN 300 743 standard. |
| DVBSUB | Digital Video Broadcasting | Sub-titling standard issued by the DVB, also designated |

| Acronym | Expression | Description |
|---|---|---|
| EBU | Subtitles European Broadcasting Union | ETSI EN 300 743. International association of radiobroadcasters. The acronym also applies to the standards produced by the organization. |
| EBU-TT | European Broadcasting Union- Timed Text | Sub-titles coding standard produced by the EBU and based on the TTML standard of the W3C. |
| ETSI | European Telecommunication Standard Institute | European standardization body for the telecommunications field. The acronym also applies to the standards produced by the institute. |
| HD | High Definition | Designates a video stream of high resolution and quality, generally exhibiting a high number of bits per second. |
| HEVC | High Efficiency Video Coding | Video compression and coding standard, also called H.265. |
| ISO | International Standard Organisation | Organization for establishing standards, notably in the multimedia field. |
| ISOBMFF | ISO Base Media File Format | Generic file format containing multi-media data. Numerous formats of files, such as the .mp4 or the .m4a, are based on the ISOBMFF. |
| MPEG | Motion Picture Experts Group | Group of experts that has issued standards for multi-media contents. This name is also applied to some of the standards produced, for example the MPEG-2 standard. |
| MPEG-TS | Motion Picture Experts Group - Transport Stream | Standard defining a multimedia transport stream defined by the MPEG committee. |
| OTT | Over The Top | Dispatching of a medium from a content provider to a reader via a standard Internet connection rather than a dedicated infrastructure. |
| PCM | Pulse Code Modulation | Uncompressed digital representation of an analog signal via a sampling technique. |
| PCR | Program Clock Reference | Temporal datum making it possible to synchronize the various multi-media streams within a program in the MPEG-TS streams. |
| PES | Packetized Elementary Stream | Specification dependent on the MPEG-2 standard, and describing the syntax of an elementary stream (video, audio, sub-titles, etc.) within an MPEG-TS stream. A PES stream is divided into PES packets that can be multiplexed with packets of other PES elementary streams within an MPEG-TS stream. |
| PCS | Page composition segment | Segment of the DVBSUB norm indicating the composition of the page of sub-titles. |
| PTS | Presentation Timestamp | Indicates a timestamp to which an element must be presented within a stream. |
| SD | Standard Definition | Designates a video stream of average resolution. |
| SDI | Serial Digital Interface | Transport or broadcasting protocol for various multi-media formats, used notably as mode of internal communication between the various modules of a video encoder. |
| SMPTE | Society of Motion Picture and Television Engineers | International association, located in the United States, developing video standards. |
| SMPTE-TT | SMPTE-Timed Text | Sub-titles coding standard devised by the SMPTE and based on W3C TTML. |
| XML | Extensible Markup Language | Computer language for information markup. |
| W3C | World Wide Web Consortium | Normalization body responsiblefor promoting the compatibility of Web technologies, notably the XML language. |
| W3C TTML | W3C Timed Text Markup Language | W3C TTML is a technique for presenting a textual support in a manner synchronized with another support, for example audio or video. |

In the present description, a set of characters intended to be displayed simultaneously on the screen will be called a "sub-titles element." A sub-titles element generally consists of a word, a set of words, or a sentence.

A set of rules for grouping and segmenting sub-titles elements into sub-titles blocks to result in a coherent presentation of the sub-titles will be called a "mode of presentation of sub-titles." A sub-titles mode defines the way in which the sub-titles elements are grouped together to be presented. It is, for example, possible to consider a "sentence by sentence" mode of presentation of sub-titles by creating a sub-titles block to be displayed simultaneously for each sentence in the sub-titles stream. Thus, the mode of presentation of sub-titles describes the way in which the words and characters are grouped together.

The mode of presentation of sub-titles must not be confused with the style of presentation of sub-titles. The style of presentation of sub-titles describes, for each character, a group of characters, or for the whole of a sub-titles stream or file, the way in which it must be represented on the screen (font and size of characters, colour, and the like).

The TTML standard of the W3C, based on the XML format, allows for particularly flexible coding of sub-titles. This standard is designed to provide a generic and extensible language for describing sub-titles, and particular implementations thereof, such as the EBU-TT standard and the SMPTE-TT standard. In the present description, the expressions "one of the W3C TTML standards," "one of the standards based on W3C TTML," "one of the TTML standards of the W3C," or similar expressions, will refer to the TTML standard of the W3C itself, as well as to the standards which constitute implementations thereof, such as the EBU-TT standard or the SMPTE-TT standard, for example.

FIGS. 1a and 1b represent two examples of video encoders producing a stream with sub-titles, one on the basis of live contents, the other on the basis of an input file, according to the prior art. FIG. 1a represents an exemplary prior art video encoder for processing live sub-titles. This encoder comprises notably: (1) a multimedia encoder 100a, itself comprising: a video encoder 101a, an audio encoder 102a, a sub-titles encoder 103a, and a stream multiplexer 104a, (2) a sub-titles inserter 112a, and (3) SDI interfaces making it possible to transmit the multimedia streams within the encoder.

This encoder produces at least one live multimedia stream, for example, a televised retransmissions of sports events or weather bulletins. According to a live multimedia content design chain commonplace in the prior art, a multimedia stream 110a containing one or more audio and video channels is produced continuously.

A sub-titles stream 111a is then added in real time to the multimedia stream 110a by the sub-titles inserter 112a so as to produce a raw multimedia stream 113a containing sub-titles. These sub-titles are generally produced by an operator re-transcribing in real time the speech expressed by the content displayed on the screen. In a general manner, the operator writes each word separately, and then dispatches the latter to the sub-titles inserter immediately so as to minimize the latency time between the audio/video content and the content of the sub-titles. The sub-titles stream which is produced can thus, according to the variations in speed of writing and understanding of the operator, exhibit variable speeds of presentation of successive words that may, when the speed becomes excessive, impair the quality of the sub-title produced. Indeed, this technique is liable to produce, on certain sequences, appearances of successive words that are extremely fast and that will thus be difficult for the viewer to read. The multimedia stream with sub-titles 113a is then dispatched, for example by way of an SDI protocol, to the multimedia encoder 100a.

The sub-titles inserter can insert a single sub-titles channel into the multimedia stream. It can also insert several sub-titles channels in parallel, notably if the sub-titles must be available in several languages. The sub-titles inserter can insert sub-titles according to all the standards accepted within the SDI protocol. It may, for example, insert sub-titles in the teletext format in the SDI.

Within the multimedia encoder 100a, the various channels of a multimedia stream, such as the stream 113a, are separated in order to be processed by the corresponding encoding modules. Each video channel is processed by video encoder 101a, each audio channel is processed by audio encoder 102a, and each sub-titles channel is processed by sub-titles encoder 103a.

Video encoder 101a converts a video stream arising from the SDI into compressed video format to allow the transmission of the video stream with a reduced bitrate. The video stream within the SDI is coded according to the so-called YUV 4:2:2 mode. According to this mode, the pixels are coded in the YUV colorimetric space, within which the so-called "Y" layer contains the luminous intensity information, and the so-called "U" and "V" layers contain the colorimetry information. In YUV 4:2:2 mode, part of the information contained in the U and V layers, considered to be less perceptible by the human eye, is deleted. Video encoder 101a transforms this stream into a compressed stream that exhibits a much lower bitrate. In order to be easily readable, the video streams are generally produced according to established standards, such as the MPEG-2 Video, H.264-AVC, or H.265-HEVC standards.

Audio encoder 102a converts an audio stream arising from the SDI into a compressed audio format to allow the transmission of the audio stream with a reduced bitrate. The audio stream within the SDI is generally coded by PCM. For example, the audio signal PCM sampling values can be 48 kHz and 24 bits, thus signifying that each audio channel comprises 48,000 samples per second, each of them containing a sound intensity value coded on 24 bits. Audio encoder 102a transforms this stream into a compressed audio stream that exhibits a much lower bitrate. In order to be easily readable, the audio streams are generally produced according to established standards, such as the MPEG-3 Audio or MPEG-4-AAC standards.

Sub-titles encoder 103a converts a sub-titles stream arising from the SDI into a standard sub-titles stream for broadcasting. Sub-titles encoder 103a converts, on the basis of the formats carried by the SDI, the sub-titles into a format decodable by standard decoders. The sub-titles carried by the SDI may, for example, be teletext sub-titles. By way of example, sub-titles encoder 103a can convert the sub-titles channels carried by the SDI into sub-titles according to the DVBSUB standard. Sub-titles encoder 103a can also produce sub-titles according to a standard using the XML format, notably one of the standards based on W3C TTML.

Stream multiplexer 104a concatenates the audio, video, sub-titles streams arising from the encoders 101a, 102a and 103a within a multimedia stream 114a that can be dispatched to the user. A stream multiplexer can produce a single stream comprising the audio, video and sub-titles streams. A stream multiplexer can also produce several multimedia streams. For example, if the audio and the sub-titles are available in several languages, the stream multiplexer can produce a multimedia stream for each of the languages used. Likewise, if the video encoder 101a is configured to produce several video streams according to several compression levels and/or multiple resolutions, the stream multiplexer 104a can produce a multimedia stream according to several compression and/or resolution levels. This is particularly useful when the stream must be dispatched to clients exhibiting different resolution and/or bandwidth contexts. For example, stream multiplexer 104a can prepare both a high-quality HD stream for televisions connected by cable and an SD stream for mobile kit.

The stream 114a produced by stream multiplexer 104a can notably be of MPEG-TS type for a live transmission. An MPEG-TS stream can contain video, audio, and sub-titles channels, as well as information for synchronizing and describing the available channels. Stream 114a can be produced and dispatched continuously by the multimedia encoder 100a. An MPEG-TS stream permits so-called multicast broadcasting, that is to say for which the encoder produces and broadcasts a single stream, which is received by various receivers. This type of stream is for example customarily used in digital terrestrial television systems.

The multimedia stream produced can also be of the ISOBMFF (ISO Based Media File Format) file format type. This type of file is customarily used for so-called OTT video transmissions. The acronym OTT stands for Over The Top, that is to say on top of the network as a whole. The aim of this mode of transmission is to be able to transmit a multimedia stream via any Internet connection without a dedicated network. This type of stream consists in sequencing the multimedia stream as short files, for example of the order of a few seconds, such as between 1 and 10 seconds. The files can then be dispatched as soon as they are formed to a client or reader. In this type of stream, a manifest file describing the various streams available must be dispatched prior to the multimedia files. This manifest file may for example contain the list of audio and sub-titles channels, if the latter are available in several languages. This type of transmission also permits so-called ABR (Adaptive Bit Rate) modes. In these modes, the video encoder produces several video streams, according to several bitrates, and the stream multiplexer 104a produces small files separated according to these various bitrates. According to the available bandwidth and the requests dispatched by the clients, files exhibiting greater or lesser bitrates are dispatched, in order to adapt the bitrate of the multimedia stream to the transmission capacity for each client.

FIG. 1b represents an exemplary multimedia encoder operating on the basis of a file according to the prior art. Encoder 100b takes as input a multimedia file 113b containing video, audio, and sub-titles channels. Encoder 100b separates the various channels and provides them to video encoder 101b, audio encoder 102b, and sub-titles encoder 103b, which are similar to encoders 101a, 102a and 103a respectively. Encoders 101b and 102b can also comprise decompression means when the audio/video streams of file 113b are compressed. The streams are then decompressed and then re-compressed by the encoders. It is also possible, when the streams present in a file 113b are compressed, not to modify one of them, for example by retaining the initial audio stream, while transcoding the video stream. The sub-titles encoder 103b can also transcode the sub-titles, for example by transforming teletext sub-titles and sub-titles according to one of the TTML standards of the W3C. Sub-titles encoder 103b can also introduce modifications to the sub-titles themselves, for example, by modifying their character fonts or timings.

Multiplexer 104b according to the prior art is capable of multiplexing the various audio, video, sub-titles streams within one or more multimedia streams 114b. Multiplexers 104b and multimedia stream 114b exhibit respectively the same properties as multiplexers 104a and multimedia stream 114a.

FIGS. 2a and 2b represent diagrams illustrating multimedia stream structures integrating sub-titles, respectively MPEG-TS and EBU-TT, one of the standards based on W3C TTML, according to the prior art. These streams may for example be streams 114a or 114b produced by stream encoders 104a or 104b. Embodiments of the invention can apply to these types of stream, but also to any type of stream integrating timed sub-titles.

FIG. 2a represents the structure of an MPEG-TS stream packet 20a that may contain sub-titles according to the prior art. Packet 20a may for example contain audio, video, or sub-titles, and may comprise a header 200a and useful information 210a. In an embodiment, useful information 210a may include one or more of: a start-of-packet prefix 211a, a stream identifier 212a, a packet size 213a, two bytes termed "flags" making it possible to apply properties to the packet 214a, an item of information regarding packet size 215a, a presentation timestamp, or PTS 216a, various other header fields 217a, and a useful data span 218a.

Header 200a may comprise information regarding synchronization with the whole of the stream. Useful information 210a may comprise the set of information making it possible to present the packet 20a correctly.

Stream identifier 212a allows a reader to determine the stream to which the packet belongs. The various streams can notably be numbered 1, 2, 3, and so on. This identifier refers to description information dispatched in the stream at regular intervals. This description information lists notably the set of streams as well as the data that they contain. Thus, a stream can designate an audio, video, or sub-titles stream whose properties have been defined previously. In particular, the description of the sub-titles stream describes the type of sub-titles stream, for example, the stream may be a sub-titles stream of DVBSUB type. The decoder is thus capable, knowing the type of stream, of decoding the stream via an appropriate decoder or decoding algorithm.

The item of information regarding packet size 215a contains the size of the packet. It allows a decoder to recover the set of useful information of the packet, so as to decode the latter correctly.

Presentation timestamp 216a contains the timestamp at which the sub-title contained in the packet must be displayed. This timestamp is expressed in a reference common to the audio, video, and sub-titles packets, thereby making it possible to display these three data in a synchronized manner. The unit of the timestamp is standardized (the PTSs are referred to a time unit of 90000 samples per second), and the initial timestamp is defined by the service clock, which corresponds to the timestamp for the start of presentation of the program in the decoder. A decoder is therefore capable, on the basis of these data, of displaying the sub-titles in a manner synchronized with the audio and the video.

Useful data span 218a contains the raw data related to the sub-titles element to be presented. For example, if the sub-titles stream complies with the DVBSUB standard, this may entail an image of bitmap type according to the terminology commonly accepted in this technical field. In this case, each sub-titles element is represented in the form of an image displayed superimposed with the video. For each image, the values of luminous intensity of each pixel are stored one after another to form an image representative of the characters to be transmitted in the sub-title.

FIG. 2b represents a sequence of sub-titles 200b according to the EBU-TT standard, one of the standards based on W3C TTML, according to the prior art. A sub-title according to this standard is organized in a hierarchical manner with various levels of XML tags. The sequence of sub-titles 200b comprises notably a header 210b. Header 210b contains notably information on the various styles (fonts, sizes of characters, colours, alignments, and the like) to be applied to the sub-title. Header 210b can also contain an item of information about the language of the sub-titles 200b, "en" signifying English in this instance.

The sequence of sub-titles 200b also contains, for each element, a body or "body" section 220b, containing at least one section termed "div" 230b. For each sub-titles element, a "p" section 240b contains notably an identifier number 243b, a start timestamp 241b, and an end timestamp 242b. The start and end timestamps are expressed in absolute time. The reader can thus synchronize the presentation of the sub-titles element with the audio and the video. A "span" tag 250b comprises the text to be displayed 251b and can contain style information 252b.

In an encoder 100a or 100b according to the prior art, a sub-titles element is created for each sub-titles element of the incoming stream or file, for example elements of the stream 113a or of the file 113b. When these sub-titles are produced live, these sub-titles elements may be presented word by word and induce an unpleasant user experience.

Embodiments of the invention advantageously provide for an approach for controlling the form of presentation of sub-titles. Embodiments can be employed in any technical context that processes sequences of sub-titles comprising at least two elements. For example, embodiments may be integrated into sub-titles encoders 103a or 103b. Embodiments can be used in conjunction with any sub-titles format. For example, embodiments may be employed with MPEG-TS sub-titles packets 20a or sequences of sub-titles complying with one of the TTML standards of the W3C200b. It should however be noted that these examples are provided solely by way of indication. Thus, embodiments may also be employed upon a decoder which displays, on a user's terminal, the sub-titles according to the desired mode of presentation. Embodiments of the invention may also be embodied using a transcoder, which will generate, on the basis of a first sequence of sub-titles, a second sequence of sub-titles, each element of which will arise from a sub-titles block according to a mode of presentation selected within the first sequence.

FIG. 3 is a flowchart of the steps involved in creating a sub-titles stream or file composed of sub-titles elements according to an embodiment of the invention. An embodiment applies to a sub-titles element 310 comprising notably a step 320 of inserting the sub-titles element into a sub-titles stream or file, a step 330 of verifying at least one end-of-block condition 340, where the end-of-block condition is related to a mode of presentation of sub-titles 360, and when at least one end-of-block condition is satisfied, the insertion into the sub-titles stream of a datum representative of the end of a block according to the mode of presentation of sub-titles 350.

Sub-titles element 310 can correspond to or include a word, a set of words, or more broadly, a string of characters initially envisaged to be displayed at the same timestamp. This may, for example, entail words contained in bytes of PES packet useful data 218a or words 252b contained within a "span" tag of a file according to one of the standards based on W3C TTML. The sub-titles element may arise from a stream, from a file, or more broadly from any source making it possible to display a sub-titles stream comprising successive elements.

In an embodiment, in step 320, a sub-titles element is inserted into a sub-titles stream or file. Step 320 may be performed by inserting the content of the sub-titles element 310 into the output stream or file. The insertion is specific to each type of output file/stream and may comprise writing the data to a memory readable by computer or dispatching data over a network. Step 320 may comprise the creation, in the output stream or file, of a sub-titles element comprising the data contained in the element 310. Step 320 may, for example, include the creation of at least one MPEG-TS packet such as that represented in FIG. 2a if the output stream or file is an MPEG-TS stream. As another example, step 320 may include the creation and the writing of at least one "div" tag and one "span" tag if the output stream or file is a file according to one of the standards based on W3C TTML.

In an embodiment, in step 330, at least one end-of-block condition 340 is verified based on the content of the sub-titles element 310, a set of modes of presentation of sub-titles 360 comprising end-of-block conditions 340, and optionally on the history of the elements previously inserted into the output stream or file.

The modes of presentation of sub-titles 360 are a set of modalities for presenting the sub-titles, such as, by way of non-limiting examples, "line by line," "sentence by sentence," and "in groups of at least 50 characters." These modes of presentation may correspond to user preferences.

Each mode of presentation is associated with an end-of-block condition 340. An end-of-block condition is a rule making it possible to separate the sub-titles blocks for a given mode of presentation and generally ensues from the definition of this mode of presentation. For example, for a "sentence by sentence" mode of presentation, the end-of-block condition will be the presence, within the sub-titles element, of an element representative of an end of sentence, for example, a full stop. Likewise, for an "in groups of at least 50 characters" mode of presentation, a block will be formed when the number of characters aggregated by the various sub-titles elements since the last block is greater than or equal to 50. In another example, for an "end of time" mode of presentation, provision is made for a block to be displayed as soon as a duration is exceeded between two successive blocks. In this mode of presentation, as soon as a block is created, the presentation timestamp for the block is noted, and the following block is created as soon as a sub-titles element whose presentation timestamp is later than the presentation timestamp of the $1^{st}$ block, to which the minimum duration is added, is identified. These are non-limiting examples and a large variety of modes of presentation and rules for segmenting blocks may be used by embodiments.

Step 330 then consists in determining which end-of-block conditions 340 are satisfied by the sub-titles element 310.

When at least one end-of-block condition 340 is satisfied by the sub-titles element 310, step 350 of inserting a datum representative of an end of block is activated. Step 350 involves writing to a file or inserting into a stream a datum expressing the end of the sub-titles block for the mode of presentation concerned. Examples will be given in the subsequent description for MPEG-TS streams and for files according to one of the standards based on W3C TTML.

In an embodiment of the invention, each of the end-of-block conditions 340 is verified for each of the modes of presentation of sub-titles 360. Each time that a condition 340 is satisfied, step 350 of inserting a datum representative of an end of block is performed for the corresponding mode of presentation of sub-titles 360.

FIGS. 4a, 4b, 4c and 4d represent four examples of sub-titles produced by an embodiment of the invention, respectively in an MPEG-TS stream structure and in files according to the EBU-TT, SMPTE-TT and W3C TTML standards.

FIG. 4a represents an exemplary MPEG-TS packet 400a in an MPEG-TS stream structure produced by an embodiment of the invention. MPEG-TS packet 400a comprises, like an MPEG-TS packet according to the prior art, a header 200a, useful data 210a, a start-of-packet prefix 211a, a stream identifier 212a, and an end-of-packet byte 218a. MPEG-TS packet 400a can also comprise a DDS segment 401a indicating the resolution on which to display the sub-titles, and a PCS segment 402a indicating the composition of a page of sub-titles, such as the number of regions to be displayed as well as their positions in the page.

MPEG-TS packet 400a may also comprise a metadata segment 410a, which includes a synchronization byte 411a, a segment type 412a, a page identifier 413a, a segment length 414a, and at least one byte representative of an end of block 420a. The synchronization bytes 411a, segment type 412a, page identifier 413a, and segment length 414a are known from the prior art. This set of elements makes it possible to define a new segment type, indicating the ends of blocks. The at least one byte representative of an end of block 420a is created during the step of inserting a datum representative of end of block 350, and comprises at least one byte representative of the end of at least one block according to a mode of presentation.

By way of non-limiting example, packet 400a comprises bytes representative of the end of 5 blocks according to 5 different modes of presentation: "end of line" 421a, "end of time" 422a, "new colour" 423a, "simple grammar analysis" 424a and "improved grammar analysis" 425a. In this instance and by way of non-limiting example, the "end of line" mode generates a block for each line of sub-titles, the "end of time" mode generates a block for the set of sub-titles elements generated over successive time periods whose duration is fixed, the "new colour" mode generates a block at each change of colour in DVBSUB sub-titles, the "simple grammar analysis" mode generates a block each time it encounters certain punctuation characters, e.g., a full stop, and the "improved grammar analysis" mode generates a block for each punctuation mark limiting sentences or parts of sentences. The "improved grammar analysis" mode thus differs from the "simple grammar analysis" mode in that, when encountering a punctuation character, the "improved grammar analysis" mode instigates a semantic analysis to determine whether this punctuation character delimits sentences or propositions. For example, in the presence of a comma, the "improved grammar analysis" mode will generate a new block only if this comma separates two propositions within a sentence. The "new colour" mode integrates an end of block at each change of colour. This mode is beneficial in the case of certain pre-processed sub-titles in which each colour has a particular meaning. For example, certain sub-titles assign a colour to each character. The "new colour" embodiment then makes it possible to automatically segment the sub-titles block-wise according to the character currently speaking. In an embodiment in the DVBSUB norm, the step of verifying the end-of-block condition can comprise the analysis, within the images representing the sub-titles in the DVBSUB norm, of the dominant RGB colour triplets. These examples of modes of presentation are given by way of illustration of the broad field of application of the invention. Other examples can be introduced without departing from the field of application of the invention.

Numerous embodiments are possible for creating bytes representative of end of block 350. In an embodiment of the invention, at least one byte is allocated for each mode of presentation, the content of which indicates whether or not an end of block is reached for this mode of presentation. In this embodiment, the number of bytes in the set of bytes representative of the block ends 420a remains constant. In another mode of embodiment of the invention, a metadata segment 410a containing bytes representative of the ends of blocks 420a is created if and only if an end of block is reached for at least one mode of presentation. The bytes representative of an end of block according to a mode of presentation, for example "end of line" 421a, contain an identifier designating this mode. A block is terminated for each of the modes whose identifier is present in the at least one byte representative of an end of block 420a. In another embodiment of the invention, a metadata segment 410a is created for each end of block according to a mode of presentation. The at least one byte representative of an end of block 420a then contains only a mode-of-presentation identifier, for example "end of time" 422a. For packet 400a, as many metadata segments 410a are created as ends of blocks are encountered for the sub-titles element contained in packet 400a.

In an embodiment of the invention, a header periodically dispatched in the MPEG-TS stream contains description information for at least one mode of presentation of sub-titles. This information can comprise the name and description of the mode of presentation.

FIG. 4b represents an exemplary sub-titles file 400b according to the EBU-TT standard (one of the W3C TTML standards) produced by an embodiment of the invention. File 400b comprises, like a file complying with the EBU-TT standard according to the prior art, a header 410b, a body contained in a "body" section 420b, at least one "div" section 430b that includes at least one "p" section 440b. As in a file complying with the EBU-TT standard according to the prior art, the "p" section 440b comprises at least a start timestamp 441b, an end timestamp 442b, a stream identifier 443b, a "span" section 450b, a text to be displayed 451b, and may include a style item of information 452b.

In an embodiment of the invention, a "p" tag 440b of file 400b may also include at least one datum representative of the end of a block according to a mode of presentation, for example a "tt:display mode" tag 460b. In one embodiment of the invention, this tag contains a reference on each of the available modes, indicating whether the sub-titles element included in the "p" tag 440b corresponds to an end of block for each of these modes. By way of non-limiting example, tag 460b of FIG. 4b indicates an end of block according to three modes: "End of line" 461b, "Simple grammar analysis" 464b, and "Improved grammar analysis" 465b, whereas it indicates an absence of end of block for two modes "End of time" 462b and "New colour" 463b. In the example indicated, the presence or the absence of an end of block is indicated respectively by the keyword "true" or "false." In another embodiment, it can be indicated by predefined values such as "1" and "0". It can also be indicated by the words "true" or "false" or generally by any keyword expressing whether or not a proposition is true.

The flexibility of the XML languages allows for many ways to indicate an end of block in the EBU-TT standard, and more generally in the standards based on W3C TTML, in accordance with an embodiment. By way of non-limiting example, in an embodiment, tag 460b comprises, instead of the exhaustive list of modes, a list of modes for which the current sub-titles element corresponds to an end of block. In another embodiment, a tag is created for each end of block according to a mode of presentation. In another embodiment, a list of the modes of presentation for which the current sub-titles element is an end of block is integrated as attribute of a tag, for example the "span" tag 450. In this embodiment, tag 450b could become for example: <tt:span style="WhiteOnBlack" list_end_blocks="end_of line simple grammar_analysis improved grammar_analysis">, indicating that the current sub-titles element marks an end of block for the three modes of presentation "End of line," "Simple grammar analysis," and "Improved grammar analysis." Of course, this list can also be included in another tag, for example the "p" tag 440b or "div" tag 430b.

In embodiments of the invention, header 410b contains description information for at least one mode of presentation of sub-titles. This information can comprise the name and description of the mode of presentation as well as the definition of a presentation style (font, colour of the characters, and the like) to be assigned to the mode of presentation for optimal display.

FIGS. 4c and 4d each represent an exemplary sub-titles file, respectively according to the SMPTE-TT and W3C TTML standards, produced by an embodiment of the invention. As the SMPTE-TT and EBU-TT standards arise from the W3C TTML standard, files 400c and 400d produced by an embodiment of the invention in accordance with the SMPTE-TT and W3C TTML standards are similar to file 400b produced according to the EBU-TT standard.

Thus, headers 410c, 410d, bodies 420c, 420d, "div" tag 430c, 430d, "p" tags 440c, 440d, start timestamp 441c, 441d, end timestamp 442c, 442d, stream identifier 443d, "span" tag 450c, 450d, text to be displayed 451c, 451d are respectively similar, apart from a few semantic differences between the standards, to headers 210b, 410b, bodies 220b, 420b, "div" tag 230b, 430b, "p" tags 240b, 440b, start timestamps 241b, 441b, end timestamp 242b, 442b, stream identifier 243b, 443b, "span" tag 250b, 450b, and text to be displayed 251b, 451b in the EBU-TT standards according to the prior art and according to the invention.

The semantic differences between the standards integrate notably different namings of tags, for example the header tag, named "tt:head" in the EBU-TT standard, and "head" in the W3C TTML and SMPTE-TT standards. The standards dependent on W3C TTML can also contain additional information and tags, such as for example the ttm:title, ttm:desc, ttm:copyright, smpte:information tags contained in the header tag 410*c*, and the origin information 444*c* in the SMPTE-TT standard.

However, these differences do not affect the capacity to implement the invention in the various standards arising from W3C TTML. Thus, a person of ordinary skill in the art can readily implement the invention in each of the W3C TTML standards in a manner equivalent to its embodiment in EBU-TT. By way of non-limiting example, the "display mode" tags 460*c* and 460*d* employ end-of-block rules identical to that of the tag 460*b*, with a value representative of the presence or otherwise of an end of block, for example according to the "end of line" 461*c*, 461*d*, "end of time" 462*c*, 462*d*, "new colour" 463*c*, 463*d*, "simple grammar analysis" 464*c*, 464*d*, "improved grammar analysis" 465*c*, 465*d* modes of presentation.

In the same manner as for the EBU-TT standard, the flexibility of the XML languages makes it possible to implement embodiment of the invention in diverse ways in the standards based on W3C TTML. By way of non-limiting examples, a tag may be inserted for each end of block into the "p" tags 440*c*, 440*d*, or else to insert a list of blocks whose current sub-titles element marks the end within the "span" tags 450*c*, 450*d* or else "p" tags 440*c*, 440*d*.

In embodiments of the invention, headers 410*c* and 410*d* contain description information for at least one mode of presentation of sub-titles. This information can comprise the name and description of the mode of presentation as well as the definition of a presentation style (font, colour of the characters, and the like) to be assigned to the mode of presentation for optimal display.

FIG. 5 is a flowchart illustrating an approach for presenting a sub-titles stream or file on a user's terminal. The process of FIG. 5 may be implemented for the presentation of sub-titles on a user's terminal, for example, within the framework of the presentation of a video with sub-titles. The process of FIG. 5 may, for example, be implemented in a set-top box, a DVD/Blu-ray reader, a computer, or smartphone possessing multimedia functions. Step 510 of FIG. 5 involves selecting a mode of presentation of sub-titles on the terminal. Step 520 involves reading a sub-titles block associated with the mode of presentation in the stream or file. Step 530 involves presenting on the terminal the at least one sub-titles block according to the mode of presentation.

In an embodiment, in step 510, the mode of presentation of sub-titles on the terminal is selected. The choice of mode of presentation can be made manually as a function of the capabilities of the terminal. For example, the choice of mode of presentation can be made with the aid of a menu and of a remote control on a set-top box or via a touch-sensitive interface on a smartphone. The list of modes of presentation can comprise solely the names of the modes or may be associated with a graphical description and/or representation of each of these modes. The choice of the mode of presentation can also be made automatically. In this case, the terminal can, if it has a user preference file, automatically select a user's preferred mode. Within the framework of video applications connected between various pieces of kit, for example, between a laptop computer and a set-top box, a terminal can also automatically select the last mode used by the user, even if it entailed a display of sub-titles on a different terminal. It is also possible to provide on one and the same terminal a mode for each user, where the mode is selected automatically when this user connects to the terminal. It is finally possible for one and the same user to have several modes on a terminal, and to select the one which seems to him the most appropriate, for example when powering up the terminal or when starting the reading of a video.

In an embodiment, in step 520, a sub-titles block in the stream or file is read. Step 520 may also involve the reading of at least a part of a sub-titles file or stream. In an embodiment, step 520 involves the reading of the characters to be displayed until encountering a datum representative of the end of a sub-titles block according to the mode of presentation selected.

In an embodiment, in step 530 the sub-titles block read in step 520 is presented as a function of the capabilities of the terminal. In embodiments of the invention, the block-wise segmentation makes it possible by itself to display the sub-titles block in the desired manner. Such is for example the case for a "sentence by sentence" display, for which a block forms a sentence. Other modes of presentation according to other embodiments of the invention constrain the presentation of the sub-titles. For example, in a "line by line" mode of presentation, each block must be displayed on a new line within the terminal.

In embodiments of the invention, step 520 of reading a sub-titles block comprises at least a step 521 of reading a sub-titles element, a step 522 of adding the element to the current sub-titles block, and a step 523 of end-of-block verification according to the mode selected.

Step 521 comprises the reading of a sub-titles element in a stream or file. Step 521 may involve reading a TS packet 400*a* in an embodiment of the invention according to the MPEG-TS standard, or reading a sub-titles tag 440*b*, 440*c*, 440*d* in an embodiment of the invention according to a W3C TTML standard.

Step 522 comprises the addition of the content of the sub-titles element in a current sub-titles block. The content of the sub-titles element can comprise characters, for example those contained in useful data 217*a* of a TS packet or the characters 251*b* contained in a tt:span tag.

Step 523 includes verifying, within the sub-titles element read, the presence or not of an element representative of an end of block according to the mode of presentation selected. In the example represented in FIG. 4*a*, step 523 would involve verification, in the span byte 420*a* related to the mode of presentation selected, whether or not it indicates an end of block. In the example represented in FIG. 4*b*, step 523 involves the verification, in the tt:display tag 460*b*, of the presence or of the absence of end of block for the mode of presentation selected.

If an end of block is detected, step 530 of presenting the block is performed, and the current block reinitialized. In the converse case, a new sub-titles element is read in step 521.

In embodiments of the invention, the sub-titles are represented in text form. Such is for example the case in the sub-titles 400*b*, 400*c*, and 400*d*, with a textual representation of the sub-titles elements 451*b*, 451*c* and 451*d*.

FIGS. 6*a*, 6*b* and 6*c* are diagrams respectively illustrating three examples of modes of presentation of sub-titles according to the prior art in FIG. 6*a* and according to the invention in FIGS. 6*b* and 6*c*.

FIG. 6*a* represents an exemplary mode of presentation of sub-titles according to the prior art. FIG. 6*a* depicts a time axis 600 that indicates the moment at which the sub-titles elements are displayed, a line 610 representing the sub-titles transmitted, and a line 630*a* representing the sub-titles displayed according to the prior art. In the example of FIG. 6*a*, the sub-titles transmitted comprise 11 elements 611, 612, 613, 614, 615, 616, 617, 618, 619, 620 and 621. These sub-titles can be transmitted in stream form, for example in a MPEG-TS stream form. In this instance, each sub-titles element corresponds to at least one TS packet 20*a*, whose presentation timestamp is a PTS 216*a*. These sub-titles can also be transmitted in file form, for example files according to one of the standards based on W3C TTML. In this case, each sub-titles element comprises at least one "p" tag 440*b*, 440*c*, 440*d*, with a presentation timestamp 441*b*, 441*c*, 441*d*.

A display according to the prior art updates the presentation of sub-titles for each new element, for example by concatenating it with the previous elements. One thus obtains 11 successive displays 631*a*, 632*a*, 633*a*, 634*a*, 635*a*, 636*a*, 637*a*, 638*a*, 639*a*, 640*a* and 641*a*. Each of these displays of sub-titles is performed at the timestamp defined by the corresponding sub-titles element. The absence of unity in the form of presentation of the sub-titles may then be disagreeable for the user.

FIG. 6*b* represents an exemplary presentation of sub-titles according to an embodiment of the invention. FIG. 6*b* depicts the time axis 600 and the line of the transmitted sub-titles 610, which is identical to that of FIG. 6*a*. FIG. 6*b* also depicts a line 630*b* representing the successive presentation of the sub-titles in this example and a line 650*b* representing the data representative of end of block according to an "end of line" mode of presentation.

By way of non-limiting example, the mode selected for display on the user's terminal is the "end of line" mode. The transmission of the sub-titles includes, in addition to the elements 611 to 621, data representative of end of blocks, at least the data representative of ends of blocks according to the "end of line" mode 656*b* and 661*b* in this example. If the sub-titles are transmitted in an MPEG-TS stream, the data 656*b* and 661*b* may for example be included in the metadata 421*a*. If the sub-titles are transmitted in a file according to one of the standards based on W3C TTML, the data 656*b* and 661*b* may for example be included in a tag 460*b*, 460*c* or 460*d*.

During presentation on the user's terminal, a block 636*b*, 641*b* comprising the content of the previous sub-titles elements is displayed at the timestamp of the corresponding datum representative of end of block 656*b*, 661*b*. An appropriate positioning of the data representative of end of block during encoding therefore makes it possible to display the sub-titles line by line and to obtain a more pleasant display of the sub-titles for the user.

FIG. 6*c* represents an exemplary presentation of sub-titles according to an embodiment of the invention. FIG. 6*c* depicts the time axis 600 and the line of the transmitted sub-titles 610, which is identical to that of FIG. 6*a*. FIG. 6*c* also depicts a line 630*c* representing the successive presentation of the sub-titles in this example and a line 650*c* representing the data representative of end of block according to a "simple grammar" mode of presentation.

By way of non-limiting example, here the mode selected for display on the user's terminal is the "simple grammar" mode. In a manner analogous to the previous example, the transmission of the sub-titles comprises, in addition to the elements 611 to 621, data representative of end of blocks, at least the data representative of ends of blocks according to the "simple grammar" mode 651*c* and 658*c* in this example.

During presentation on the user's terminal, a block 631*c*, 638*c* comprising the content of the previous sub-titles elements is displayed at the timestamp of the corresponding datum representative of end of block 656*b*, 661*b*. In this example, an appropriate positioning of the elements representative of end of block makes it possible to display the sub-titles until encountering a punctuation mark such as a comma or a full stop, and to obtain a display of the sub-titles that is more pleasant for the user.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory computer-readable storage mediums storing one or more sequences of instructions for creating a sub-titles stream or file composed of sub-titles elements, wherein execution of the one or more sequences of instructions by one or more processors causes:

for each sub-titles element in said sub-titles elements, performing:
  inserting a sub-titles element into the sub-titles stream or file;
  determining whether at least one end-of-block condition, of a set of two or more end-of-conditions, related to a mode of presentation of sub-titles is satisfied by the inserted sub-titles element; and
  upon satisfying said at least one end-of-block condition, inserting into the sub-titles stream or file a datum representative of an end of a block according to each mode of presentation of sub-titles that is satisfied by the inserted sub-titles element.

2. The one or more non-transitory computer-readable storage mediums of claim 1, wherein said at least one end-of-block condition comprises a detection of at least one predefined character marking an end of the block.

3. The one or more non-transitory computer-readable storage mediums of claim 2, wherein said at least one predefined character corresponds to or comprises a full stop, a comma, a semi-colon, or a punctuation character.

4. The one or more non-transitory computer-readable storage mediums of claim 1, wherein the sub-titles stream complies with the MPEG-TS standard.

5. The one or more non-transitory computer-readable storage mediums of claim 1, wherein the file complies with at least one standard based on W3C TTML.

6. The one or more non-transitory computer-readable storage mediums of claim 5, wherein a datum representative of the end of a block is written in a specific tag.

7. One or more non-transitory computer-readable storage mediums storing one or more sequences of instructions for presenting a sub-titles stream or file on the terminal of a user, wherein execution of the one or more sequences of instructions by one or more processors causes:

selecting on the terminal a mode of presentation of sub-titles;
reading at least one sub-titles block from the sub-titles stream or file, wherein the sub-titles stream or file comprises a plurality of datums that are collectively representative of an end of a block for two or more modes of presentation in the sub-titles stream or file; and presenting on the terminal the at least one sub-titles block according to the selected mode of presentation.

8. The one or more non-transitory computer-readable storage mediums of claim 7, wherein reading the at least one sub-titles block comprises:

reading of the sub-titles stream or file up to a datum representative of the end of a sub-titles block according to the selected mode of presentation of sub-titles.

9. The one or more non-transitory computer-readable storage mediums of claim 7, wherein the sub-titles stream complies with the MPEG-TS standard.

10. The one or more non-transitory computer-readable storage mediums of claim 7, wherein the file complies with at least one standard based on W3C TTML.

11. The one or more non-transitory computer-readable storage mediums of claim 10, wherein a datum representative of the end of a block is written in a specific tag.

12. An apparatus for creating a sub-titles stream or file composed of sub-titles elements, comprising:

one or more processors; and one or more non-transitory computer-readable storage mediums storing one or more sequences of instructions, which when executed, cause:

for each sub-titles element in said sub-titles elements, performing:

inserting a sub-titles element into the sub-titles stream or file;

determining whether at least one end-of-block condition, of a set of two or more end-of-conditions, related to a mode of presentation of sub-titles is satisfied by the inserted sub-titles element; and upon satisfying said at least one end-of-block condition, inserting into the sub-titles stream or file a datum representative of an end of a block according to each mode of presentation of sub-titles that is satisfied by the inserted sub-titles element.

13. The apparatus of claim 12, wherein said at least one end-of-block condition comprises a detection of at least one predefined character marking an end of the block.

14. The apparatus of claim 13, wherein said at least one predefined character corresponds to or comprises a full stop, a comma, a semi-colon, or a punctuation character.

15. The apparatus of claim 12, wherein the sub-titles stream complies with the MPEG-TS standard.

16. The apparatus of claim 12, wherein the file complies with at least one standard based on W3C TTML.

17. The apparatus of claim 16, wherein a datum representative of the end of a block is written in a specific tag.

18. An apparatus for presenting a sub-titles stream or file on the terminal of a user, comprising:

one or more processors; and one or more non-transitory computer-readable storage mediums storing one or more sequences of instructions, which when executed, cause:

selecting on the terminal a mode of presentation of sub-titles;

reading at least one sub-titles block from the sub-titles stream or file, wherein the sub-titles stream or file comprises a plurality of datums that are collectively representative of an end of a block for two or more modes of presentation in the sub-titles stream or file; and presenting on the terminal the at least one sub-titles block according to the selected mode of presentation.

19. The apparatus of claim 18, wherein reading the at least one sub-titles block comprises:

reading of the sub-titles stream or file up to a datum representative of the end of a sub-titles block according to the selected mode of presentation of sub-titles.

20. The apparatus of claim 18, wherein the sub-titles stream complies with the MPEG-TS standard.

21. The apparatus of claim 18, wherein the file complies with at least one standard based on W3C TTML.

22. The apparatus of claim 21, wherein a datum representative of the end of a block is written in a specific tag.

* * * * *